United States Patent [19]

Bach

[11] Patent Number: 4,572,753
[45] Date of Patent: Feb. 25, 1986

[54] METHOD OF ULTRASONIC WELDING AND APPARATUS THEREFOR

[75] Inventor: Gary Bach, Appleton, Wis.

[73] Assignee: The Coca-Cola Company, Atlanta, Ga.

[21] Appl. No.: 630,190

[22] Filed: Jul. 12, 1984

[51] Int. Cl.[4] .............................................. B29C 27/08
[52] U.S. Cl. .................................... 156/73.1; 156/290;
156/308.4; 156/309.6; 156/498; 156/580.2;
156/581; 264/23; 425/174.2
[58] Field of Search ...................... 156/73.1, 73.4, 157,
156/309.6, 380.8, 580.1, 580.2, 581, 290, 308.4,
498; 264/23; 425/174.2

[56] References Cited

U.S. PATENT DOCUMENTS

| | | | |
|---|---|---|---|
| 3,258,385 | 6/1966 | Lake | 156/581 |
| 3,442,732 | 5/1969 | Stensaker et al. | 156/73.4 |
| 3,563,822 | 2/1971 | Fesh | 156/73.1 |
| 3,666,602 | 5/1972 | Obeda | 156/73.4 |
| 3,725,164 | 4/1973 | Albinger et al. | 156/502 X |
| 3,867,232 | 2/1975 | Thompson et al. | 156/502 |
| 4,018,955 | 4/1977 | Kauke et al. | 428/57 |
| 4,132,519 | 1/1979 | Reed | 425/174.2 |
| 4,146,416 | 3/1979 | Goldman | 156/580.1 |
| 4,482,421 | 11/1984 | Gurak | 156/580.1 |

*Primary Examiner*—Michael Wityshyn
*Attorney, Agent, or Firm*—Birch, Stewart, Kolasch & Birch

[57] ABSTRACT

A welding tip configuration for ultrasonically welding thermoplastic material includes a plate with conical projections extending from a planar surface thereof and reservoirs recessed below the planar surface and spaced from the projections. The reservoirs facilitate the displacement of molten material away from the conical projections.

39 Claims, 4 Drawing Figures

METHOD OF ULTRASONIC WELDING AND APPARATUS THEREFOR

FIELD OF THE INVENTION

This invention relates to an ultrasonic welding apparatus. More particularly, this application relates to a spot welding tip for an ultrasonic welding apparatus.

BACKGROUND OF THE INVENTION

Ultrasonic welding has been used for bonding in a number of materials. Most commonly, ultrasonic bonding is utilized in theremoplastic materials. Recently, it has been discovered that ultrasonic spot welding could be accomplished. See, for example, the November–December 1980 issue of *Plastics Design Forum,* page 86. This publication recognizes the existence of ultrasonic spot welding as well as its advantage in producing a clean appearance on the surface opposite the weld. This article recognizes that the standard tip is inserted one and one-half times the thickness of a sheet of material. The article further recognizes the possibility of inverse spot welding, that is fitting the tip to the mounting fixture or anvil and utilizing a flat faced horn to provide ultrasonic energy.

The use of ultrasonic spot welding is further recognized by an article entitled "Ultrasonic Assembly", by R. A. Clarke published in the 1980–81 *Modern Plastics Encyclopedia,* page 447–450. In this article, Clarke recognizes the general incorporation of the annular ring design in the horn or tip for ultrasonic spot welding.

It is an object of the present invention to produce improved spot welds.

It is another object of the present invention to produce improved spot welds in sheet thermoplastic material.

It is a further object of the present invention to provide these welds along a relatively lengthy weld line and to produce these welds with a tip design which is self-releasing from the sheet material upon completion of the weld.

It is a still further object of the present invention to provide a welding tip which may be used for inverse spot welding in thermoplastic material and which may be removed from contact with the sheet material by displacement only in a direction parallel to the line along which the spot welds are produced.

These and other objects of the present invention will become more fully apparent with reference to the following specification, drawings and claims which relate to the preferred embodiments of the present invention.

SUMMARY OF THE INVENTION

A welding tip includes a plurality of conical projections interspersed with a plurality of reservoir portions. The conical projections are placed in contact with the material to be welded and ultrasonic energy is applied to the material. The ultrasonic energy is concentrated by the conical projections and heats the sheet material adjacent to these projections to thereby soften the material. The softened material is displaced by the conical projections and is gathered in reservoir portions of the tip which are provided for accumulation of the displaced material. The material continues to be softened and displaced until the conical projections are substantially fully inserted into the sheet material. The conical projections in the preferred embodiment are right circular conical or pyramid in shape or are configured so as to allow self-release of the sheet material therefrom. The reservoirs are constructed with a volume significantly greater than the volume of the conical projection in order to allow for expansion in the displaced material.

BRIEF DESCRIPTION OF THE DRAWINGS

The present invention will become more fully understood from the detailed description given hereinbelow and the accompanying drawings which are given by way of illustration only and wherein.

DETAILED DESCRIPTION OF PREFERRED EMBODIMENTS

Figure 1:
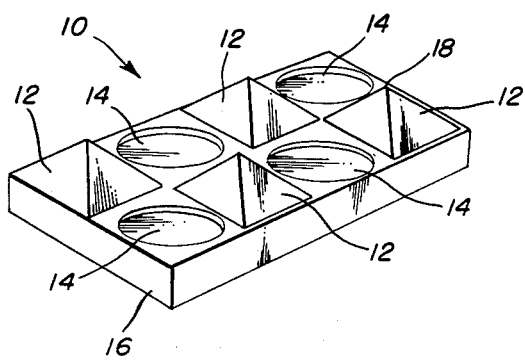
FIG. 1 is a perspective of a portion of a welding tip of the present invention.

Referring to FIG. 1, the welding tip of the present invention (generally indicated as 10) includes a plurality of conical projections 12 alternately interspersed with a plurality of reservoirs 14 along a tip base 16. The conical projections 12 serve to concentrate ultrasonic energy where they contact the sheet material at their respective apices 18. While the conical projections may be formed in any shape suitable for concentrating the ultrasonic energy and facilitating self-release which will be described hereinbelow, FIG. 1 illustrates one form of cone. It should be noted, that the term cone is intended to encompass its broadened meaning and is not intended to limit the present application to the right circular cone which is merely one embodiment of cone utilizable in the welding tip of the present invention.

In a welding tip such as that illustrated in FIG. 1 the distance between cone apex and base should be configured to equal approximately one and one-half times the thickness of the sheet material to be welded. Further, the cone base is desirably constructed with a width of approximately twice the cone's height or about three times the thickness of the sheet material to be bonded.

Figure 2:
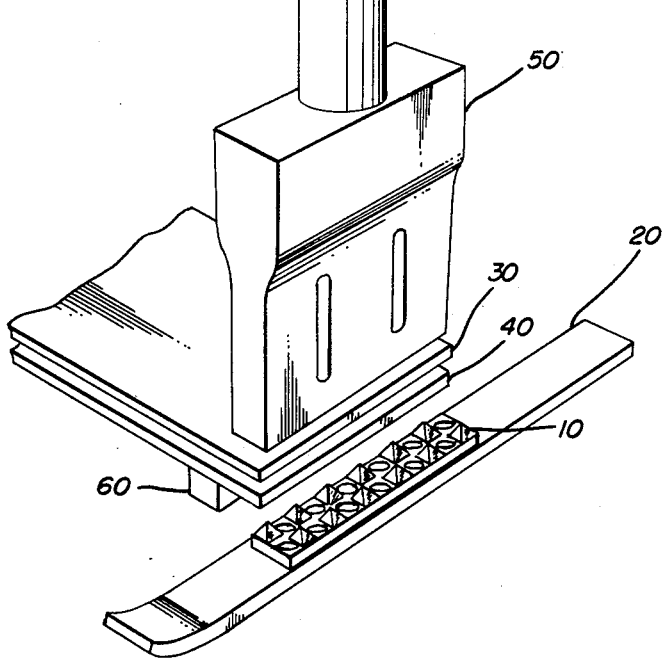
FIG. 2 is a schematic perspective of the use of the welding tip of the present invention in welding sheet material in an inverse spot welding process.

FIG. 2 of the present application illustrates the use of the tip 10 of FIG. 1 in an inverse ultrasonic spot welding process. To facilitate inverse ultrasonic spot welding, the welding tip 10 is securely fastened to an anvil or mounting bar 20 which is positioned on one side of two sheets of material to be welded 30, 40. FIG. 2 further illustrates the placement of an ultrasonic transducer or horn 50 on the other side of the sheets of material to be bonded by spot welding according to the teachings of the present invention.

The spot welder schematically illustrated in FIG. 2 functions as follows. The material to be bonded is supported by a support 60 with the first and second sheets 30, 40 juxtaposed along the desired lines to be welded. The tip 10 of the present invention is presented into contact with one side of the juxtaposed first and second sheets of material 30, 40 by movement of the anvil 20 upon which it is disposed. Simultaneously, the ultrasonic transducer or horn 50 is moved in a line perpendicular to the plane of the respective sheets of material in order to engage the other side of the sheets. Ultrasonic energy is applied to the sheets of material to be bonded via the ultrasonic horn 50. As the conical projections 12 of the welding tip 10 contact the sheet material at alternating spots therealong, the ultrasonic energy is concentrated at these spots. The sheet material is thereby softened and displaced by contact with the conical projections 12. The sheet material which is softened is accumulated in reservoirs 14 to remove the material from the area of ultrasonic energy concentration to avoid overheating of the softened material and to concentrate the ultrasonic energy on unsoftened material.

When the spot welds have been completed to their desired depth with the conical projections fully inserted into the sheet material, the ultrasonic energy is withdrawn. Cooling of the sheet thermoplastic causes shrinkage thereof. The configuration of the conical projections 12 is such that the welding tip self-releases from the sheet material. Thus, the configuration of the welding tip of FIG. 1 facilitates self-release of the tip from the sheet material after welding and produces improved welds by providing reservoirs for accumulating the softened sheet material juxtaposed to the conical projections 12.

While the FIG. 2 embodiment of the present invention illustrates the technique known as inverse spot welding, it is possible to utilize the welding tip of the present invention in normal spot welding by affixing the tip to the ultrasonic horn 50.

In the preferred embodiment, the welding tip of the present invention is utilized to spot weld high density polyethylene sheet. However, any suitable material may be welded utilizing the welding apparatus of the present invention.

Similarly, in the present invention, the welding horn could be made of any suitable material as can the welding tip 10 of the present invention. In the preferred embodiment, the welding tip 10 is manufactured of aluminum and is then hard-coat anodized for better abrasion resistance. The tip is then treated with polytetrafluoroethylene known under the trademark "TEFLON" to prevent surface sticking.

The reservoirs 14 of the FIG. 1 welding tip are semispherical in shape and are typically sized to accumulate about 1.5 times the volume displaced by an associated conical projection. The volume of each reservoir should be at least 1 and ⅓ times the volume of an associated conical projection.

Figure 3:
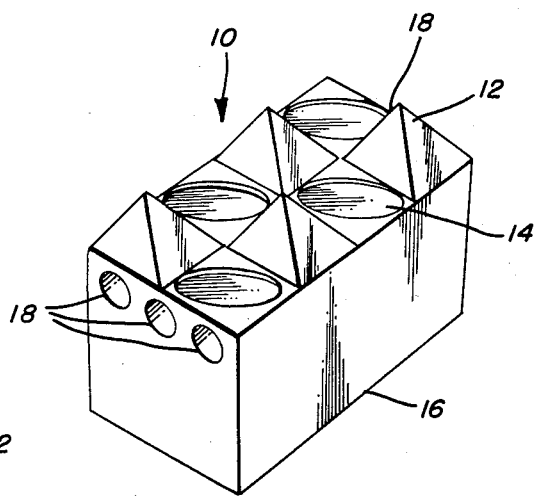
FIG. 3 is a perspective of a portion of the welding tip of the present invention illustrating the provision of cooling passages therein.

When the system of the present invention is utilized in automated production, residual heat buildup within the welding tip can be troublesome. Without adequate precautionary measures, the temperature of the welding tip can become sufficient to cause the sheet material to melt to the welding tip. Referring to FIG. 3, where like numerals designate like parts with FIG. 1, cooling passages may be provided within the welding tip 10 in order to control the temperature thereof. The temperature may then be controlled by controlling the flow rate of the coolant or by other means in order to maintain the welding tip to the desired temperature. With polyethylene, it is desirable to maintain the temperature at about 90° Fahrenheit. When the welding tip reaches 130° to 140° Fahrenheit the polyethylene begins to stick to the tip. The weld tip 10 of the present invention may be either made integral with the anvil 20 or may be made replaceably fixable thereto.

In the specific application for which the system of the present invention is utilized, it is necessary to move the anvil 20 and weld tip 10 into place by moving the anvil in a direction parallel to the weld line produced. No significant movement perpendicular to the plane of the sheet materials is therefore permitted in this embodiment. Therefore, it is desirable to configure the weld tip so as to easily slide away from the completed weld along a direction parallel to the weld line.

Figure 4:
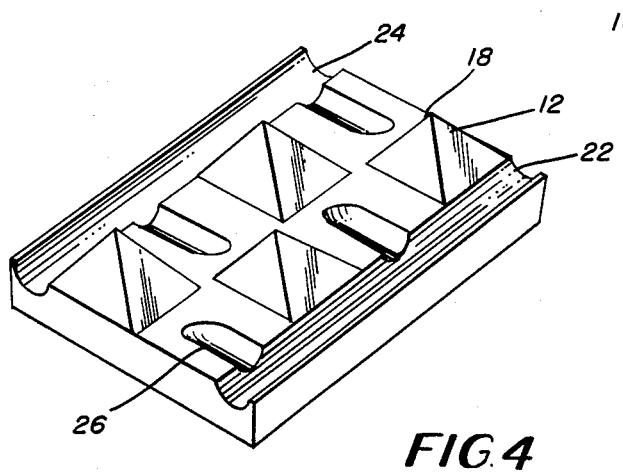
FIG. 4 is a perspective of a portion of a welding tip according to the teachings of the present invention in which the semi-spherical reservoirs are replaced by troughs disposed adjacent the cylindrical projections and parallel to the weld line.

In FIG. 4, where like elements are also designated by like numerals, a modified weld tip is illustrated wherein the semispherical reservoirs of FIG. 1 are replaced by a pair of peripheral troughs 22, 24 arranged on either side of the alternately arranged conical projections 12. These troughs 22, 24 are fed by a plurality of feeder trough reservoir portions 26 which direct the molten sheet material into the troughs 22, 24 for collection. Upon completion of the weld, the weld tip of FIG. 4 may be more easily removed from juxtaposition with the sheet material in a direction parallel to the mold line as there is no significant accumulation of material between the interspersed conical projections 12 in the area where reservoirs 14 of the FIG. 1 embodiment would otherwise accumulate material. Therefore, the lateral movement of the weld tip may be more easily facilitated.

It should become apparent to one of ordinary skill in the art that various changes and modifications may be made in the device of the present invention which are within the contemplation of the inventor. Thus, the scope of the present application should not be construed as limited by the specification or drawings thereof, but must be determined from review of the claims included herewith.

I claim:

1. Means for spot welding sheet material comprising:
   ultrasonic energy application means for providing ultrasonic vibrational energy to heat said material;
   plate means having a planar face with projections extending therefrom for concentrating said ultrasonic vibrational energy at desired spots to be welded; and
   reservoir means adjacent said spots but spaced therefrom for receiving material displaced from juxtaposition with said means for concentrating to thereby strengthen the resulting welds, said reservoir means being recessed below the planar face of said plate means.

2. The means of claim 1 wherein said projections include a conical projection corresponding to each spot to be welded, the conical projections being configured so as to self release from said sheet material.

3. Means for spot welding sheet material comprising:
   ultrasonic energy application means for providing ultrasonic vibrational energy to heat said material;
   plate means having a planar face with projections extending therefrom for concentrating said ultrasonic vibrational energy at at least a desired spot to be welded;
   means for placing said ultrasonic application means and said means for concentrating into contact with said sheet material along a seam to be welded and for maintaining said contact until welding is completed; and
   reservoir means adjacent said spots but spaced therefrom for receiving material displaced from juxtaposition with said means for concentrating to thereby strengthen the resulting welds, said reservoir means being recessed below the planar face of said plate means.

4. The means of claim 3 further comprising means for cooling said means for concentrating so as to maintain a temperature below which said material would stick to said means for concentrating.

5. The means of claim 3 wherein said sheet material is a thermoplastic.

6. The means of claim 3 wherein said projections include a conical projection corresponding to each spot to be welded, the conical projections being configured so as to self release from said sheet material.

7. The means of claim 6 wherein said cones are right circular cones.

8. The means of claim 6 wherein said cones are pyramids.

9. The means of claim 6 wherein the total volume of said reservoir means is at least 1 and $\frac{1}{3}$ the total volume of said conical projections.

10. The means of claim 6 wherein said reservoir means includes a reservoir associated with each conical projection.

11. The means of claim 10 wherein each reservoir has a volume at least 1 and $\frac{1}{3}$ the volume of its associated conical projection.

12. The means of claim 6 wherein said reservoir means includes a plurality of reservoir portions alternately interspersed with said conical projections along said plate means.

13. The means of claim 12 wherein the volume of said reservoir portions is at least 1 and $\frac{1}{3}$ times the volume of said conical projections.

14. The means of claim 12 wherein said reservoir portions and conical projections are formed integrally as a welding tip.

15. The means of claim 12 wherein said reservoir portions are semi-spherical in shape.

16. The means of claim 12 wherein said reservoir means includes a trough disposed adjacent said conical projections substantially parallel to said weld line; said trough being interconnected to said reservoir portions, said reservoir portions channeling said displaced material into said trough.

17. The means of claim 16 wherein a trough is provided on each side of said weld line.

18. The means of claim 17 wherein the volume of said troughs and said reservoir portions is at least 1 and $\frac{1}{3}$ times the volume of said conical projections.

19. The means of claim 6 further comprising temperature control means for cooling said conical projections to prevent sticking of said sheet material thereto.

20. The means of claim 19 wherein said temperature control means includes cooling passages within said anvil means.

21. Means for spot welding sheet material comprising:
means for supporting first and second sheets in juxtaposition along a desired weld line;
ultrasonic generator means for producing ultrasonic energy;
ultrasonic transducer means located on a first side of said sheet material for transmitting ultrasonic energy to said sheet material along side weld line;
plate means having planar face with projection extending therefrom for concentrating said ultrasonic vibrational energy at desired spots to be welded along said weld line;
anvil means for supporting said plate means for concentrating on a second side of said weld line;
means for placing said ultrasonic transducer means and said plate means for concentrating into contact with said sheet material along said weld line and for maintaining said contact until welding is completed; and
reservoir means recessed in said plate means and spaced from said projections, said reservoir means receiving material displaced from juxtaposition with said means for concentrating to thereby strengthen the resulting welds.

22. The means of claim 21 wherein said means for placing and maintaining withdraws said transducer means and said means for concentrating from contact with said sheet material upon completion of said welds; said plate means for concentrating being configured so as to facilitate self release from said sheet material as said material cools.

23. The means of claim 22 wherein said means for placing and maintaining moves said anvil only in a lateral direction substantially parallel to said weld line; said plate means for concentrating and said reservoir means being configured so as to easily separate from the welded sheet material by said lateral movement.

24. The means of claim 22 wherein said projections include a conical projection corresponding to each spot welded, the conical projections being configured so as to self release from said sheet material.

25. The means of claim 24 further comprising temperature control means for cooling said conical projections to prevent sticking of said sheet material thereto.

26. The means of claim 25 wherein said temperature control means includes cooling passages within said anvil means.

27. The means of claim 24 wherein said sheet material is a thermoplastic.

28. The means of claim 24 wherein said reservoir means includes a plurality of reservoir portions alternately interspersed with said conical projections along said plate means.

29. The means of claim 28 wherein the volume of said reservoir portions is at least 1 and $\frac{1}{3}$ times the volume of said conical projections.

30. The means of claim 28 wherein said reservoir portions are semi-spherical in shape.

31. The means of claim 28 wherein said means for placing and maintaining lowers said transducer means into contact with said sheet material in a direction substantially perpendicular to the plane defined by said material.

32. The means of claim 28 wherein said means for placing and maintaining moves said anvil only in a lateral direction substantially parallel to said weld line;
said conical projections and said reservoir portions being configured so as to easily separate from the welded sheet material by said lateral movement.

33. The means of claim 32 wherein said reservoir means includes a trough disposed adjacent said conical projections substantially parallel to said weld line;
said trough being interconnected to said reservoir portions, said reservoir portions channeling said displaced material into said trough.

34. The means of claim 33 wherein a trough is provided on each side of said weld line.

35. The means of claim 34 wherein the volume of said troughs and said reservoir portions is at least 1 and ⅓ times the volume of said conical projections.

36. The means of claim 28 wherein said reservoir portions and conical projections are formed integrally as a welding tip.

37. The means of claim 36 wherein said welding tip is formed integrally with said anvil means.

38. The means of claim 36 wherein said welding tip is hard coat anodized.

39. A method of spot welding sheet material comprising:

ultrasonically applying vibrational energy to said sheet material to heat said material;

concentrating said vibrational energy at spots desired to be welded by applying said ultrasonic energy through projections extending from the planar surface of a plate; and providing reservoirs spaced from but adjacent said spots for facilitating displacement of molten material produced by said heating process to strengthen the resulting welds, said reservoirs being recessed in the planar surface of said plate.

* * * * *